United States Patent
Absar et al.

(10) Patent No.: US 7,203,717 B1
(45) Date of Patent: Apr. 10, 2007

(54) FAST MODIFIED DISCRETE COSINE TRANSFORM METHOD

(75) Inventors: Mohammed Javed Absar, Singapore (SG); Sapna George, Singapore (SG)

(73) Assignee: STMicroelectronics Asia Pacific Pte. Ltd., Singapore (SG)

( * ) Notice: Subject to any disclaimer, the term of this patent is extended or adjusted under 35 U.S.C. 154(b) by 0 days.

(21) Appl. No.: 10/129,046

(22) PCT Filed: Oct. 30, 1999

(86) PCT No.: PCT/SG99/00113

§ 371 (c)(1),
(2), (4) Date: Oct. 10, 2002

(87) PCT Pub. No.: WO01/33411

PCT Pub. Date: May 10, 2001

(51) Int. Cl.
*G06F 17/14* (2006.01)
(52) U.S. Cl. .................................. 708/402
(58) Field of Classification Search .............. 708/402
See application file for complete search history.

(56) References Cited

U.S. PATENT DOCUMENTS

| | | | |
|---|---|---|---|
| 3,803,391 A | 4/1974 | Vernet | 235/152 |
| 4,051,357 A | 9/1977 | Bonnerot | 364/726 |
| 4,164,021 A | 8/1979 | Nishitani et al. | 364/726 |
| 5,349,549 A * | 9/1994 | Tsutsui | 708/402 |
| 5,363,096 A * | 11/1994 | Duhamel et al. | 341/50 |
| 5,475,789 A * | 12/1995 | Nishiguchi | 704/200 |
| 5,581,654 A * | 12/1996 | Tsutsui | 704/200.1 |
| 5,619,197 A * | 4/1997 | Nakamura | 341/50 |
| 5,625,745 A * | 4/1997 | Dorward et al. | 704/227 |

FOREIGN PATENT DOCUMENTS

EP  0 535 893 A2  4/1993

\* cited by examiner

*Primary Examiner*—Tan V. Mai
(74) *Attorney, Agent, or Firm*—Lisa K. Jorgenson; E. Russell Tarleton; Seed IP Law Group PLLC

(57) ABSTRACT

A technique for computationally efficient evaluation of the Modified Discrete Cosine Transform (MDCT) using the Fast Fourier Transform (FFT) method is presented in which the input of the FFT block consists of a sequence of N complex numbers, and this complex data is evaluated using an N/2-Point FFT only, thereby descreasing computation burden almost by two.

9 Claims, 3 Drawing Sheets

FAST MODIFIED DISCRETE COSINE TRANSFORM METHOD

FIELD OF THE INVENTION

This invention is applicable in the field of multi-channel audio coders which use a modified discrete cosine transform as a step in the compression of audio signals.

BACKGROUND OF THE INVENTION

Recent years witnessed an unprecedented advancement in audio coding technology. This has led to high compression ratios while keeping audible degradation in the compressed signal to a minimum. These coders are intended for a variety of applications, including 5.1 channel film soundtracks, HDTV, laser discs and multimedia. Description of a compression method used in such coders can be found in the ATSC Standard, "*Digital Audio Compression* (AC-3) *Standard*", Document A/52, 20 Dec. 1995.

In the basic approach, at the encoder the time domain signal is sectioned into frames, each frame comprising of a number of blocks. The time domain signal in each block is first converted to the frequency domain using a bank of filters. The frequency domain coefficients, thus generated, are next converted to floating point representation. In floating point syntax, each coefficient is represented as a mantissa and an exponent. The bulk of the compressed bitstream transmitted to the decoder comprises these exponents and mantissas.

The coders are expected to operated in real time. Therefore it is important that the processing at both the encoders and decoders be highly optimised. The ATSC standard outlines a method for conversion of the inverse cosine transform to Fast Fourier Transform to obtain remarkable speed gain.

Frequency transformation presents one of the greatest computation requirements in any transform coder. Therefore, an efficient implementation of this phase can decrease the computation requirement of the system significantly and make real time operation of encoder an easily attainable possibility.

In some encoders such as the AC-3, the frequency domain transformation of signals is performed by the modified discrete cosine transform (MDCT). If directly implemented, the MDCT requires $O(N^2)$ additions and multiplications.

However it is possible to reduce the number of required operations significantly if one is able to express the MDCT equation into a form that is amenable to the use of the well known Fast Fourier Transform (FFT) method of J. W. Cooley and J. W. Tukey (1960).

To compute the MDCT of a sequence of N real data, conventional methods use a system comprising of a pre-processing block, an N-point FFT block and finally a post-processing block.

SUMMARY OF THE INVENTION

In accordance with the disclosed embodiments of the invention, there is provided a method of evaluating a modified discrete cosine transform (MDCT) of an input sequence of complex data using a Fast Fourier Transform (FFT), wherein the FFT is a N/2-Point FFT.

Preferably, the MDCT is of the form:

$$X_k = \sum_{n=0}^{n=N-1} x[n] * \cos(2\pi*(2n+1)*(2k+1)/4N + \pi*(2k+1)/4)$$

$$k = 0\ldots(N/2-1)$$

where x[n] represents the input sequence and N is the number of data samples in the sequence.

Preferably, a transform coefficient sequence of the MDCT is derived using the N/2-Point FFT of a complex function (z[n], where $$G_k = \frac{1}{2}\left[Z_k + Z_{\frac{N}{2}-k-1}^n\right] + \frac{e^{j\frac{n(2k+1)}{N}}}{2j}\left[Z_k - Z_{\frac{N}{1}-k-1}^n\right]$$

Preferably, a transform $Z_k$ and the complex conjugate of the transform $Z_{N/2-k-1}$ are derived from z[n] for the expression $$z[n] = (x[2n] + jx[2n+1])e^{j\frac{2\pi n}{N}}, 0 \le n \le (N/2-1)$$

where $G_k$ is a transform coefficient sequence which allows the MDCT to be evaluated, in that $$G_k = g_{k,r} + jg_{k,j} = \sum_{n=0}^{n=N-1} \left(x[n]e^{j\pi n/N}\right) * e^{j2\pi nk/N}$$

which can be used to solve the MDCT when rewritten as $$X_k = \cos\gamma(k)\frac{1/2\left(e^{j\pi(k+1/2)/N}G_k + e^{-j\pi(k+1/2)/N}G_k^*\right)}{\tau_1} -$$

$$\sin\gamma(k)\frac{1/2j\left(e^{j\pi(k+1/2)/N}G_k - e^{-j\pi(k+1/2)/N}G_k^*\right)}{} =$$

$$\cos\gamma * \frac{(g_{k,r}\cos(\pi(k+1/2)/N) - g_{k,j}\sin(\pi(k+1/2)/N))}{\tau_1} -$$

$$\sin\gamma * \frac{(g_{k,r}\sin(\pi(k+1/2)/N) + g_{k,j}\cos(\pi(k+1/2)/N))}{\tau_{11}}$$

BRIEF DESCRIPTION OF THE DRAWINGS

The invention is more fully described, by way of non-limiting example only, with reference to the drawings, in which.

DETAILED DESCRIPTION OF A PREFERRED EMBODIMENT

Figure 1:
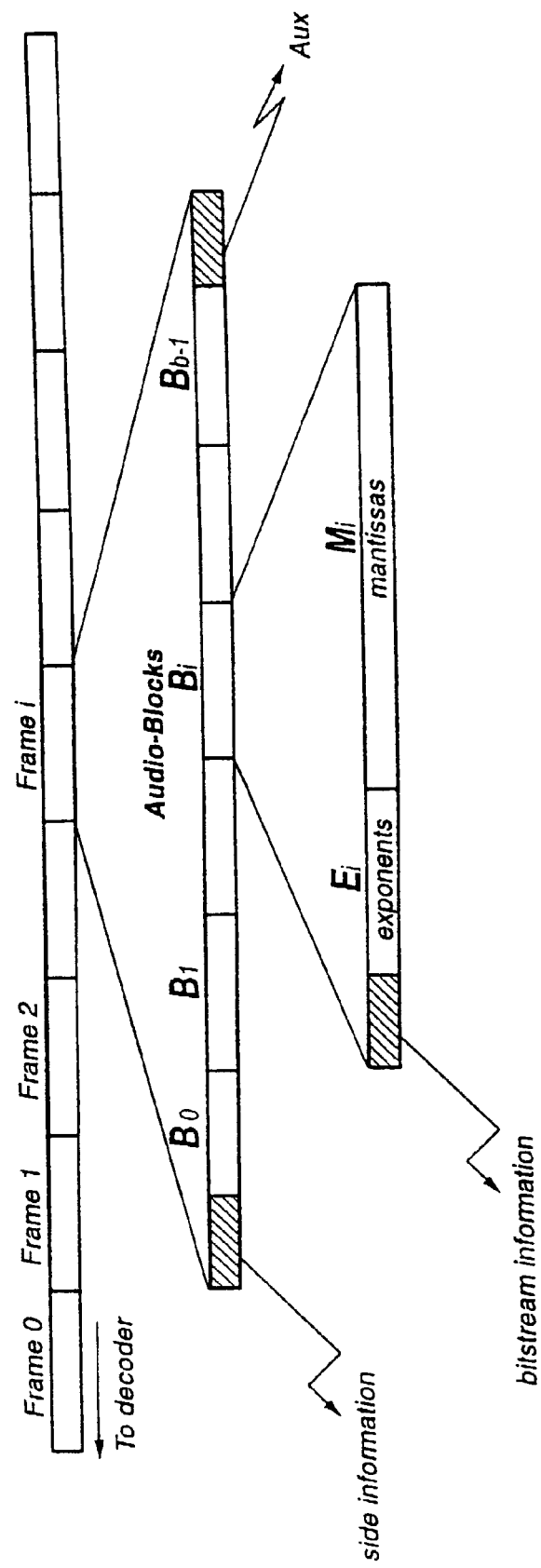
FIG. 1 is a representation of an audio input sequence.
Figure 2:
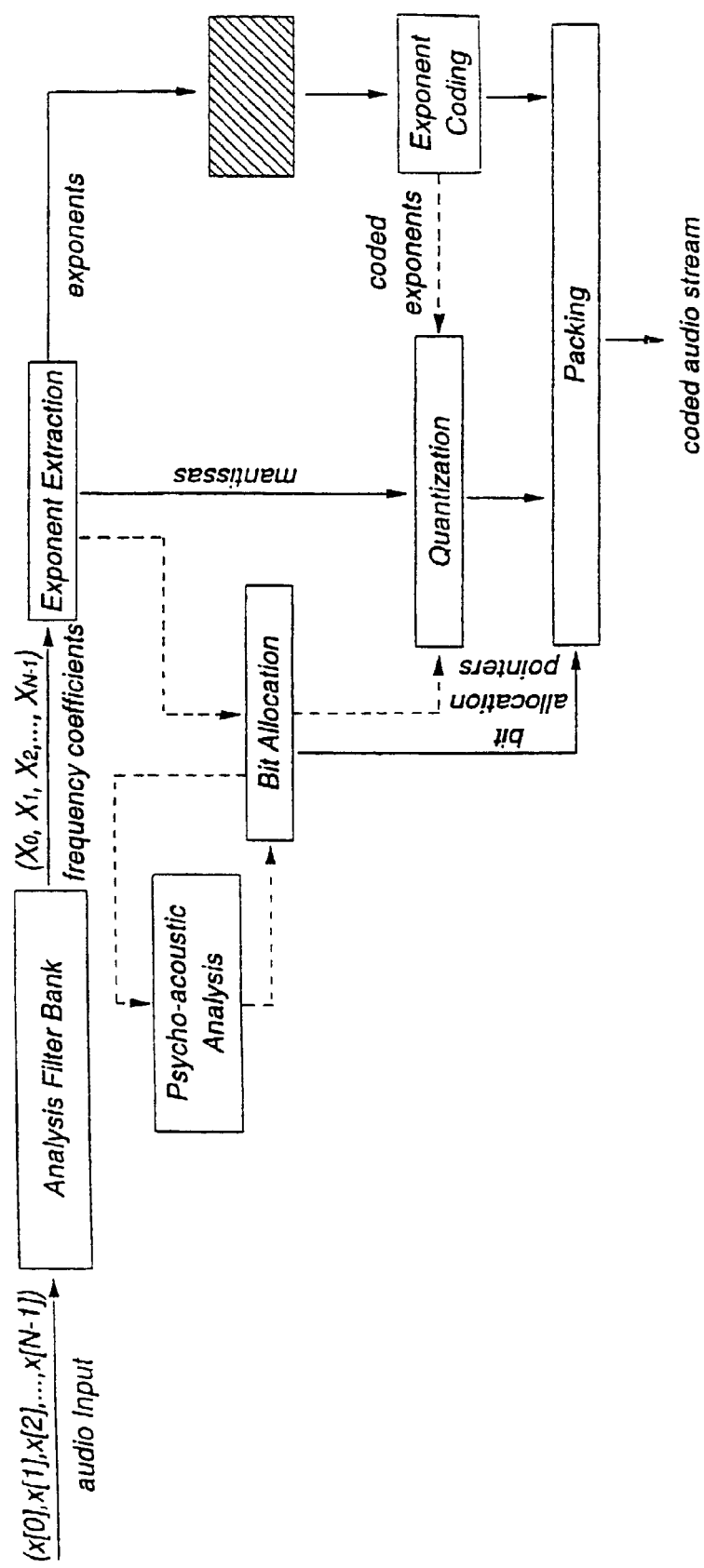
FIG. 2 is a diagrammatic representation of an encoder.

The input to an audio coder comprises a stream of digitized samples of a time domain analog signal. For a multi-channel encoder the stream consists of interleaved samples for each channel, the input stream is sectioned into blocks, each block containing N consecutive samples of each channel (see FIG. 1). Thus within a block the N samples of a channel form a sequence $\{x[0], x[1], x[2], \ldots, x[N-1]\}$. The time domain samples are next converted to the frequency domain using an analysis filter bank (see FIG. 2).

The frequency domain coefficients, thus generated, form a coefficient set which can be identified as $(X_0, X_1, X_2, \ldots, X_{N/2-1})$. Since the signal is real only the first N/2 frequency components are considered. Here $X_0$ is the lowest frequency (DC) component while $X_{N/2-1}$ is the highest frequency component of the signal.

Audio compression essentially entails finding how much of the information in the set $(X_0, X_1, X_2, \ldots, X_{N/2-1})$ is necessary to reproduce the original analog signal at the decoder with minimal audible distortion.

The coefficient set is normally converted into floating point format, where each coefficient is represented by an exponent and mantissa.

The exponent set is usually transmitted in its original form. However, the mantissa is truncated to a fixed or variable number of decimal places. The value of the number of bits fro coding a mantissa is usually obtained from a bit allocation algorithm, which for advanced psychoacoustic coders may be based on the making property of the human auditory system. A low number of bits results in higher compression ratio because less space is required to transmit the coefficients. However this causes a very high quantization error leading to audible distortion. A good distribution of available bits to each mantissa forms the core of the most advanced encoders.

In some encoders such as the AC-3, the frequency domain transformation of signals is performed by the (MDCT) modified discrete cosine transform (Eq. 1).

$$X_k = \sum_{n=0}^{n=N-1} x[n] * \cos(2\pi*(2n-1)*(2k-1)/4N - \pi*(2k+1)/4) \quad \text{Eq. 1}$$

$$k = 0 \ldots (N/2-1)$$

If directly implemented in the form given above, the MDCT requires $O(N^2)$ additions and multiplications.

However it is possible to reduce the number of required operations significantly if one is able to evaluate Eq. 1 using the well known Fast Fourier Transform method of J. W. Cooley and J. W. Tukey (1960). The general Discrete Fourier Transform (DFT) is given below (Eq. 2). It requires $O(N^2)$ complex additions and multiplications. But by using the Fast Fourier Transform method the DFT in Eq. 2 can be computed with $O(N\log_2 N)$ operations only. Eq. 2.

$$F_k = \sum_{n=0}^{n=N-1} \left( x[n] * e^{2\pi jnk/N} \right)$$

$$k = 0 \ldots N-1$$

Here j is the symbol for imaginary number, i.e. $J = \sqrt{-1}$.

Although it may not be immediately apparent how Eq. 1 can be transformed to Eq. 2, a careful analysis shows that this is indeed possible. To simplify Eq. 1, let us define two functions $$\alpha(n,\kappa) = 2\pi(2n+1)(2\kappa+1)/4N \quad \text{Eq. 3}$$

and $$\gamma(\kappa) = \pi(2\kappa+1)/4 \quad \text{Eq. 4}$$

Then, using functions, Eq. 1 can be rewritten as $$bbb$$

In Eq. 6 the trigonometric equality, $\cos(a+b) = \cos a \cos b - \sin a \sin b$ is used for simplification. Furthermore, since the function $\gamma(\kappa)$ is only dependent on variable n, it can be brought outside the summation expression to give $$X_k = \cos\gamma(k) \underbrace{\sum_{n=0}^{n=N-1} x[n] * \cos\alpha(n,k)}_{T_1} - \sin\gamma(k) \underbrace{\sum_{n=0}^{n=N-1} x[n] * \sin\alpha(n,k)}_{T_2} \quad \text{Eq. 7}$$

The two terms, $T_1$ and $T_2$, in Eq. 7 can now be evaluated separately. From Euler's identity $e^{j\theta} = \cos\theta + j\sin\theta$, we know that $\cos\alpha(n,\kappa) = (e^{j\alpha(n,\kappa)} + e^{-j\alpha(n,\kappa)})/2$ and $\sin\alpha(n,\kappa) = (e^{j\alpha(n,\kappa)} - e^{-j\alpha(n,\kappa)})2j$. Therefore we can rewrite the terms $T_1$ and $T_2$ as $$T_1 = \sum_{n=0}^{n=N-1} x[n] * (e^{j\alpha} - e^{-j\alpha})/2 = \quad \text{Eq. 8}$$

$$1/2 \left\{ \underbrace{\sum_{n=0}^{n=N-1} x[n] * e^{j\alpha}}_{A_1} + \underbrace{\sum_{n=0}^{n=N-1} x[n] * e^{-j\alpha}}_{A_2} \right\}$$

$$T_2 = \sum_{n=0}^{n=N-1} x[n] * (e^{j\alpha} - e^{-j\alpha})/2j = \quad \text{Eq. 9}$$

$$1/2j \left\{ \underbrace{\sum_{n=0}^{n=N-1} x[n] * e^{j\alpha}}_{A_1} + \underbrace{\sum_{n=0}^{n=N-1} x[n] * e^{-j\alpha}}_{A_2} \right\}$$

We evaluate the term $A_1$. From Eq. 8 and Eq. 9 note that $$A_1 = \sum_{n=0}^{n=N-1} x[n] * e^{j\alpha}$$

$$= \sum_{n=0}^{n=N-1} x[n] * e^{j(2\pi(2n+1)(2k+1)/4N}$$

$$= e^{j\pi(k+1/2)/N} * \sum_{n=0}^{n=N-1} \left( x[n] * e^{j\pi n/N} \right) * e^{j2\pi nk/N} \quad \text{Eq. 10}$$

If we define a complex variable $$\chi^1[n] = \chi[n] * e^{j\kappa n/N} \quad \text{Eq. 11}$$

then the Eq. 10 is simply $$A_1 = e^{j\pi(k+1/2)/N} * \underbrace{\sum_{n=0}^{n=N-1} x'[n] * e^{j2\pi nk/N}}_{G_k} \quad \text{Eq. 12}$$

The complex term $G_\kappa = g_{\kappa,r} + jg_{\kappa,i}$, where $g_{\kappa,l}$ and $g_{k,i} \in \Re$ (set of real numbers) in Eq. 12 is essentially the same as $F_{78}$ in Eq. 2. Therefore the FFT approach can be used to evaluate $G_{78}$. This brings down the computation from $O/N^2$ to $O(N\log_2 N)$. We can now, similarly, evaluate the second term $A_2$ in Eq. 8 and Eq. 9.

$$A_2 = \sum_{n=0}^{n=N-1} x[n] * e^{-j\alpha(n,k)} =$$  Eq. 13

$$e^{-j\pi(k+1/2)/N} * \underbrace{\sum_{n=0}^{n=N-1} (x[n] * e^{-j\pi n/N}) * e^{-j2\pi nk/N}}_{G_i}$$

Note that $G_\kappa^*$ is actually the complex conjugate of $G_\kappa$ which was obtained earlier by Eq. 12. That is, if $G_\kappa = g_{\kappa,r} + jg_{k,i}$, where $g_{\kappa,i} \in \Re$ as defined earlier then $G_\kappa^* = g_{\kappa,r} - jg_{\kappa,i}$. Therefore, $G_\kappa^*$ in Eq. 12 does not need to computed again and result from Eq. 12 can be reused. That is only one FFT needs to be computed for the evaluation of $T_1$. Using Eq. 8 to 13 we obtain $$T_1 = \tfrac{1}{2}(e^{j\pi(\kappa+1/2)/N} G_{\kappa+e}{}^{-k\pi(\kappa+1/2)/N} G_\kappa^*)$$  Eq. 14

Next, we analyse the term $T_2$.

$$T_2 = \sum_{n=0}^{n=N-1} x[n] * (e^{j\alpha} - e^{-j\alpha})/2j$$  Eq. 15
$$= 1/2j(A_1 - A_2)$$
$$= 1/2j(e^{j\pi(k+1/2)/N} G_k - e^{-j\pi(k+1/2)/N} G_k^*)$$

Finally after simplifications of Eq. 7, 14 and 15 we obtain $$X_k = \cos\gamma(k)\underbrace{1/2(e^{j\pi(k+1/2)/N} G_k + e^{-j\pi(k+1/2)/N} G_k^*)}_{T_1} -$$  Eq. 16
$$\sin\gamma(k)\underbrace{1/2j(e^{j\pi(k+1/2)/N} G_k - e^{-j\pi(k+1/2)/N} G_k^*)}_{T_2}$$
$$= \cos\gamma * \underbrace{(g_{k,r}\cos(\pi(k+1/2)/N) - g_{k,i}\sin(\pi(k+1/2)/N)}_{T_1} -$$
$$\sin\gamma * \underbrace{(g_{k,r}\sin(\pi(k+1/2)/N) + g_{k,i}\cos(\pi(k+1/2)/N)}_{T_2}$$

Figure 3:
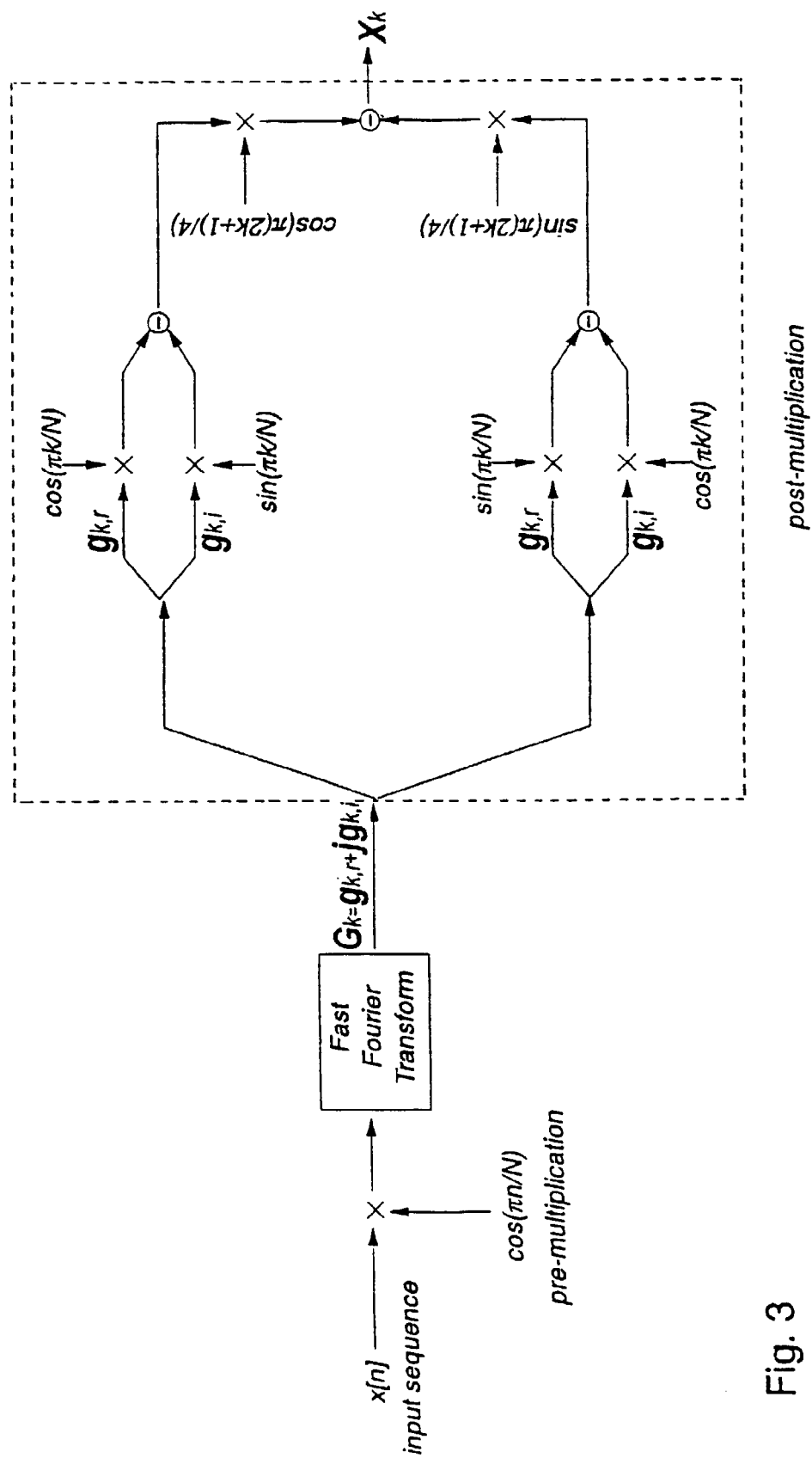
FIG. 3 illustrates evaluation of the input sequence into a coefficient set.

The term $G_\kappa = g_{\kappa,r} + jg_{\kappa,I}$ may be computed in $O(N\log N)$ operation using FT algorithms. The additional operation outlined in Eq. 16 to extract the final $X_\kappa$ is only of order $O(N)$. Therefore the MDCT can now be computed in $O(N\log_2 N)$ time. The operations required to obtain the MDCT is illustrated in FIG. 3.

N-Point MDCT Using N/2-Point FFT

Since the most computationally intensive part is the FFT, we shall focus on it in order to decrease computation even further. The values of $$G_k = \sum_{n=0}^{N-1}\left[(x[n]e^{j\frac{\pi n}{N}})e^{j\frac{2\pi nk}{N}}\right]$$

required in Eq. 16 may be obtained through an N/2-Point FFT.

It is well known that an N-Point FFT of a sequence of N real data can be easily obtained by using a N/2-Point FFT only, provided the FFT is preceded by a pre-processing and followed by a post-processing which formats the inputs so that the final result is mathematically identical in both cases.

In our present case, the input to the FFT block is a sequence of N complex data. To evaluate the FFT of N arbitrary complex numbers, an N-Point FFT is definitely required. A M-Point FFT, M<N will not do. In the present cas however, the input sequence is not completely an arbitrary complex sequence but is of the form $$x[n]e^{j\frac{\pi n}{N}},$$

where x[n] is real.

$$G_k = \sum_{n=0}^{N-1}\left[(x[n] * e^{j\frac{\pi n}{N}})e^{j\frac{2\pi nk}{N}}\right]$$

Let us define $$z[n] = (x[2n] + jx[2n+1])e^{j\frac{2\pi n}{N}},$$

$0 \leq n \leq (N/2-1)$. Then, taking a N/2-Point FFT of $z[n]$.

$$Z_k = \sum_{n=0}^{N/2-1}\left[z[n]e^{j\frac{2\pi nk}{N/2}}\right], 0 \leq k \leq N/2-1$$

Therefore, $$Z_{\frac{N}{2}-k-1} = \sum_{n=0}^{N/2-1}\left[z[n]e^{-j\frac{2\pi nk}{N/2}} e^{-j\frac{2\pi n}{N/2}}\right].$$

Taking the complex conjugate of $$Z_{\frac{N}{2}-k-1}$$

gives us $$Z^*_{\frac{N}{2}-k-1} = \sum_{n=0}^{N/2-1}\left[z^*[n]e^{j\frac{2\pi nk}{N/2}} e^{j\frac{2\pi n}{N/2}}\right].$$

Also, note that with some simplifications we obtain $$z[n] + z^*[n]e^{j\frac{2\pi n}{N/2}} = 2x[2n]e^{j\frac{x(2n)}{N}} \text{ and } z[n] - z^*[n]e^{j\frac{2\pi n}{N/2}} = 2x[2n]e^{j\frac{x(2n)}{N}}.$$

We now have all the essential derivations for us to obtain $G_\kappa$ from $Z_\kappa$.

$$\frac{1}{2}\left[Z_k + Z^*_{\frac{N}{2}-k-1}\right] = \frac{1}{2}\left[\sum_{n=0}^{N/2-1}\left[z[n]e^{j\frac{2\pi nk}{N/2}}\right] + \sum_{n=0}^{N/2-1}\left[z^*[n]e^{j\frac{2\pi nk}{N/2}}e^{j\frac{2\pi n}{N/2}}\right]\right]$$

$$= \frac{1}{2}\left[\sum_{n=0}^{N/2-1}\left[\left(z[n] + z^*[n]e^{j\frac{2\pi n}{N/2}}\right)e^{j\frac{2\pi nk}{N/2}}\right]\right]$$

$$= \frac{1}{2}\sum_{n=0}^{N/2-1}\left[\left(2x[2n]e^{j\frac{x(2n)}{N}}\right)e^{j\frac{2\pi(2n)k}{N}}\right]$$

$$= \sum_{n=0}^{N/2-1}\left[\left(x[2n]e^{j\frac{x(2n)}{N}}\right)e^{j\frac{2\pi(2n)k}{N}}\right]$$

$$\frac{e^{j\frac{x(2k+1)}{N}}}{2j}\left[Z_k - Z^*_{\frac{N}{2}-k-1}\right] = \frac{e^{j\frac{x(2k+1)}{N}}}{2j}\left[\sum_{n=0}^{N/2-1}\left[z[n]e^{j\frac{2\pi nk}{N/2}}\right] - \sum_{n=0}^{N/2-1}\left[z^*[n]e^{j\frac{2\pi nk}{N/2}}e^{j\frac{2\pi n}{N/2}}\right]\right]$$

$$= \frac{e^{j\frac{x(2k+1)}{N}}}{2j}\left[\sum_{n=0}^{N/2-1}\left[\left(z[n] - z^*[n]e^{j\frac{2\pi n}{N/2}}\right)e^{j\frac{2\pi nk}{N/2}}\right]\right]$$

$$= \frac{e^{j\frac{x(2k+1)}{N}}}{2j}\left[\sum_{n=0}^{N/2-1}\left(2jx[2n+1]e^{j\frac{x(2n)}{N}}\right)e^{j\frac{2\pi(2n)k}{N}}\right]$$

$$= \sum_{n=0}^{N/2-1}\left[\left(x[2n+1]e^{j\frac{x(2n+1)}{N}}\right)e^{j\frac{2\pi(2n+1)k}{N}}\right]$$

Now it is straight forward to get $G_K$ from $Z_K$.

$$\frac{1}{2}\left[Z_k + Z^*_{\frac{N}{2}-k-1}\right] + \frac{e^{j\frac{x(2k+1)}{N}}}{2j}\left[Z_k - Z^*_{\frac{N}{2}-k-1}\right] =$$

$$\sum_{n=0}^{N/2-1}\left[\left(x[2n]e^{j\frac{x(2n)}{N}}\right)e^{j\frac{2\pi(2n)k}{N}}\right] + \sum_{n=0}^{N/2-1}\left[\left(x[2n+1]e^{j\frac{x(2n+1)}{N}}\right)e^{j\frac{2\pi(2n+1)k}{N}}\right] =$$

$$\sum_{n=0}^{N-1}\left[\left(x[n]*e^{j\frac{xn}{N}}\right)e^{j\frac{2\pi nk}{N}}\right]$$

Accordingly, use of an N/2-Point FFT allows $G_K$ to be derived, which inturn allows the MDCT of the complex input signal to be evaluated, with reduced computational requirements.

What is claimed is:

1. A method of evaluating a modified discrete cosine transform (MDCT) of an input sequence of complex signal data in an audio signal processor, comprising:
using a Fast Fourier Transform (FFT), wherein the FFT is a N/2-Point FFT, to evaluate, the complex data, from audio signals and wherein the MDCT is $$X_k = \sum_{n=0}^{n=N-1} x[n]*\cos(2\pi*(2n+1)*(2k+1)/4N + \pi*(2k+1)/4)$$

$$k = 0 \ldots (N/2-1)$$

where x[n] represents the input sequence and N is the number of data samples in the sequence.

2. The method of claim 1, wherein a transform coefficient sequence of the MDCT is derived using the N/2-Point FFT of a complex function z[n], where $$z[n] = (x[2n] + jx[2n+1])e^{j\frac{2\pi n}{N}}, 0 \le n \le (N/2-1).$$

3. The method of claim 2, wherein a transform $Z_k$ and the complex conjugate of the transform $Z_{N/2-k-1}$ are derived from z[n] for the expression $$G_k = \frac{1}{2}\left[Z_k + Z^*_{\frac{N}{2}-k-1}\right] + \frac{e^{j\frac{x(2k+1)}{N}}}{2j}\left[Z_k - Z^*_{\frac{N}{2}-k-1}\right]$$

where Gk is a transform coefficient sequence which allows the MDCT to be evaluated, in that $$G_k = g_{k,r} + jg_{k,i} = \sum_{n=0}^{n=N-1}(x[n]e^{j\pi n/N})*e^{j2\pi nk/N}$$

which can be used to solve the MDCT when rewritten as $$X_k = \cos\gamma(k)\underbrace{1/2(e^{j\pi(k+1/2)/N}G_k + e^{-j\pi(k+1/2)/N}G^*_k)}_{T_1} -$$

$$\underbrace{\sin\gamma(k)1/2j(e^{j\pi(k+1/2)/N}G_k - e^{-j\pi(k+1/2)/N}G^*_k)}_{} =$$

$$\cos\gamma * \underbrace{(g_{k,r}\cos(\pi(k+1/2)/N) - g_{k,i}\sin(\pi(k+1/2)/N)}_{T_1} -$$

$$\sin\gamma * \underbrace{(g_{k,r}\sin(\pi(k+1/2)/N) + g_{k,i}\cos(\pi(k+1/2)/N)}_{T_w}.$$

4. A multi-channel audio coder, comprising:
an encoder configured to receive a time domain signal and to convert the time domain signal into a frequency domain signal by evaluating a modified discrete cosine transform (MDCT) using a Fast Fourier Transform (FFT) that is a N/2-Point FFT where N is the number of data samples and the MDCT is of the form $$X_k = \sum_{n=0}^{n=N-1} x[n]*\cos(2\pi*(2n+1)*(2k+1)/4N + \pi*(2k+1)/4) \; k =$$

$$0\ldots(N/2-)$$

where x[n] represents an input sequence and N is the number of data samples of the sequence.

5. The method of claim 4, wherein a transform coefficient sequence of the MDCT is derived using the N/2-Point FFT of a complex function z[n], where $$z[n] = (x[2n] + jx[2n+1])e^{j\frac{2\pi n}{N}}, 0 \le n \le (N/2-1).$$

6. A multi-channel audio coder, comprising:
an encoder configured to receive a time domain signal and to convert the time domain signal into a frequency domain signal by evaluating a modified discrete cosine transform (MDCT) using a Fast Fourier Transform (FFT) that is a N/2-Point FFT where N is the number of data samples and the MDCT is of the form $$X_k = \sum_{n=0}^{n=N-1} x[n] * \cos(2\pi*(2n+1)*(2k+1)/4N + \pi*(2k+1)/4) \quad k = 0 \ldots (N/2-1)$$

where x[n] represents an input sequence and N is the number of data samples of the sequence, and wherein a transform coefficient sequence of the MDCT is derived using the N/2-Point FFT of a complex function z[n], where $$z[n] = (x[2n] + jx[2n+1])e^{j\frac{2\pi n}{N}}, \quad 0 \le n \le (N/2-1)$$

and wherein a transform Zk and the complex conjugate of the transform $Z_{N/2-k-1}$ are derived from z[n] for the expression $$G_k = \frac{1}{2}[Z_k + Z_{\frac{N}{2}-k-1}] + \frac{e^{\frac{x(2k+1)}{N}}}{2j}[Z_k - Z_{\frac{N}{2}-k-1}]$$

where Gk is a transform coefficient sequence which allows the MDCT to be evaluated, in the $$G_k = g_{k,r} + jg_{k,i} = \sum_{n=0}^{n=N-1} (x[n]e^{j\pi n/N}) * e^{j2\pi nk/N}$$

which can be used to solve the MDCT when rewritten as $$X_k = \cos\gamma(k)\underline{1/2(e^{j\pi(k+1/2)/N}G_k + e^{-j\pi(k+1/2)/N}G_k^*)}_{T_1} -$$

$$\sin\gamma(k)\underline{1/2j(e^{j\pi(k+1/2)/N}G_k - e^{-j\pi(k+1/2)/N}G_k^*)} =$$

$$\cos\gamma * \underline{(g_{k,r}\cos(\pi(k+1/2)/N) - g_{k,i}\sin(\pi(k+1/2)/N)}_{T_1} -$$

$$\sin\gamma * \underline{(g_{k,r}\sin(\pi(k+1/2)/N) + g_{k,i}\cos(\pi(k+1/2)/N))}_{T_w}.$$

7. A method of coding a multi-channel time domain audio signal, comprising:
receiving multiple time domain audio signals at an encoder and converting the time domain audio signals into complex frequency domain data by evaluating a modified discrete cosine transform (MDCT) using a Fast Fourier Transform (FFT) that is a N/2-Point FFT, where N is the number of data samples, wherein the MDCT is of the form:

$$X_k = \sum_{n=0}^{n=N-1} x[n] * \cos(2\pi*(2n+1)*(2k+1)/4N + \pi*(2k+1)/4) \quad k = 0 \ldots (N/2-1)$$

where x[n] represents an input sequence and N is the number of data samples of the sequence.

8. The method of claim 7 wherein a transform coefficient sequence of the MDCT is derived using the N/2-Point FFT of a complex function z[n], where $$z[n] = (x[2n] + jx[2n+1])e^{j\frac{2\pi n}{N}}, \quad 0 \le n \le (N/2-1).$$

9. The method of claim 8 wherein a transform Zk and the complex conjugate of the transform $Z_{N/2-k-1}$ are derived from z[n] for the expression $$G_k = \frac{1}{2}[Z_k + Z_{\frac{N}{2}-k-1}] + \frac{e^{\frac{x(2k+1)}{N}}}{2j}[Z_k - Z_{\frac{N}{2}-k-1}]$$

where Gk is a transform coefficient sequence which allows the MDCT to be evaluated, in that $$G_k = g_{k,r} + jg_{k,i} = \sum_{n=0}^{n=N-1} (x[n]e^{j\pi n/N}) * e^{j2\pi nk/N}$$

which can be used to solve the MDCT when rewritten as $$X_k = \cos\gamma(k)\underline{1/2(e^{j\pi(k+1/2)/N}G_k + e^{-j\pi(k+1/2)/N}G_k^*)}_{T_1} -$$

$$\sin\gamma(k)\underline{1/2j(e^{j\pi(k+1/2)/N}G_k - e^{-j\pi(k+1/2)/N}G_k^*)} =$$

$$\cos\gamma * \underline{(g_{k,r}\cos(\pi(k+1/2)/N) - g_{k,i}\sin(\pi(k+1/2)/N)}_{T_1} -$$

$$\sin\gamma * \underline{(g_{k,r}\sin(\pi(k+1/2)/N) + g_{k,i}\cos(\pi(k+1/2)/N))}_{T_w}.$$

* * * * *

UNITED STATES PATENT AND TRADEMARK OFFICE
CERTIFICATE OF CORRECTION

PATENT NO. : 7,203,717 B1  
APPLICATION NO. : 10/129046  
DATED : April 10, 2007  
INVENTOR(S) : Mohammed Javed Absar et al.

Page 1 of 1

It is certified that error appears in the above-identified patent and that said Letters Patent is hereby corrected as shown below:

Column 7  
Line 56 Claim 1, "a N/2 - Point FFT, to evaluate, the complex data, from" should read as -- a N/2 - Point FFT, to evaluate the complex data, from --

Column 8  
Line 34 Claim 3, $$\text{"}\sin\gamma * \frac{(g_{k,r}\sin(\pi(k+1/2)/N) + g_{k,i}\cos(\pi(k+1/2)/N))}{T_w}\text{"}$$

should read as $$-- \sin\gamma * \frac{(g_{k,r}\sin(\pi(k+1/2)/N) + g_{k,i}\cos(\pi(k+1/2)/N))}{T_w} --$$

Column 9  
Line 31 Claim 6, "the MDCT to be evaluated, in the" should read as -- the MDCT to be evaluated, in that --

Signed and Sealed this

Twenty-fourth Day of March, 2009

JOHN DOLL  
*Acting Director of the United States Patent and Trademark Office*